United States Patent
Chan et al.

(10) Patent No.: US 11,403,571 B2
(45) Date of Patent: *Aug. 2, 2022

(54) TEAM-BASED APPROACH TO SKILLS-BASED AGENT ASSIGNMENT

(71) Applicant: ORACLE INTERNATIONAL CORPORATION, Redwood Shores, CA (US)

(72) Inventors: Victor Chung-Wai Chan, Saratoga, CA (US); W. Scott Seebauer, San Diego, CA (US); Timothy Barnes, Kansas City, MO (US); Dana Allison, Honeoye, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,753

(22) Filed: Sep. 19, 2019

(65) Prior Publication Data

US 2020/0012992 A1 Jan. 9, 2020

Related U.S. Application Data

(63) Continuation of application No. 14/074,040, filed on Nov. 7, 2013, now Pat. No. 10,445,670.

(51) Int. Cl.
*G06Q 10/06* (2012.01)

(52) U.S. Cl.
CPC . *G06Q 10/063112* (2013.01); *G06Q 10/0633* (2013.01); *G06Q 10/063114* (2013.01)

(58) Field of Classification Search
CPC ....... G06Q 10/063112; G06Q 10/0633; G06Q 10/063114

(Continued)

(56) References Cited

U.S. PATENT DOCUMENTS

| 5,036,535 A * | 7/1991 | Gechter | H04M 3/523 379/265.11 |
| 6,424,709 B1 * | 7/2002 | Doyle | H04M 3/5233 379/265.12 |

(Continued)

FOREIGN PATENT DOCUMENTS

EP 2338270 A2 6/2011

OTHER PUBLICATIONS

Enterprise skills routing: A better solution for today's call center. Gechter, Jerry. Telemarketing & Call Center Solutions 15.8: 28, 134+. Technology Marketing Corporation. (Feb. 1997).*

(Continued)

*Primary Examiner* — Timothy Padot
(74) *Attorney, Agent, or Firm* — Kraguljac Law Group, LLC (57) ABSTRACT

Embodiments provide systems and methods for a team-based approach to skills-based agent assignment in task routing systems. According to one embodiment, performing skills-based task assignments in a task routing system can comprise identifying a team of agents. The team of agents can comprise a plurality of agents handling a currently assigned task but expected to become available for assignment of a new task. Each agent of the team of agents can be earmarked to one of a plurality of new tasks selected from a queue of tasks. At some point, one of the agents of the team can be detected as being available and the agent detected as being available can be assigned to one of the plurality of new tasks based at least in part on consideration of the earmarking of the agents of the team to the plurality of new tasks.

15 Claims, 6 Drawing Sheets (58) Field of Classification Search
USPC .......................................................... 705/7.14
See application file for complete search history.

(56) References Cited

U.S. PATENT DOCUMENTS

| | | | |
|---|---|---|---|
| 6,553,114 B1 | 4/2003 | Fisher et al. | |
| 6,661,889 B1 | 12/2003 | Flockhart et al. | |
| 7,050,566 B2 | 5/2006 | Becerra et al. | |
| 7,062,031 B2 | 6/2006 | Becerra et al. | |
| 7,263,183 B1* | 8/2007 | Klein | H04M 3/5232 |
| | | | 379/265.09 |
| 7,593,521 B2 | 9/2009 | Becerra et al. | |
| 7,885,401 B1* | 2/2011 | Mullen | H04M 3/523 |
| | | | 379/265.11 |
| 8,238,543 B2 | 8/2012 | Shashkov et al. | |
| 8,693,674 B1* | 4/2014 | Darby | H04M 3/5158 |
| | | | 379/265.11 |
| 2003/0081757 A1 | 5/2003 | Mengshoel et al. | |
| 2006/0062376 A1* | 3/2006 | Pickford | H04M 3/5233 |
| | | | 379/265.12 |
| 2007/0038499 A1* | 2/2007 | Margulies | G06Q 10/06316 |
| | | | 705/7.26 |
| 2008/0077470 A1* | 3/2008 | Yamanaka | G06Q 10/06 |
| | | | 705/7.31 |
| 2010/0303225 A1* | 12/2010 | Shashkov | H04M 3/5158 |
| | | | 379/265.11 |
| 2011/0069821 A1 | 3/2011 | Korolev et al. | |
| 2012/0278136 A1 | 11/2012 | Flockhart et al. | |
| 2013/0202102 A1* | 8/2013 | Jaiswal | H04M 3/5238 |
| | | | 379/266.01 |
| 2014/0140498 A1* | 5/2014 | Mezhibovsky | H04M 3/5141 |
| | | | 379/265.13 |

OTHER PUBLICATIONS

Call center management: Balancing the numbers Tsily Friedman. Industrial Management. Norcross: Jan./Feb. 2001. vol. 43, Iss. 1; p. 6, 5 pgs.*
Witness Systems Enhances Contact Center Performance Optimization Suite. Business Wire; Aug. 26, 2003: 5321; pp. 1-6.
IntelliCenter Makes Information Access Easy. Computer Telephony: S16. CMP Media, Inc. (Mar. 1997) pp. 1-3.
"Analytics Optimized Routing: Working Smarter to Maximize Conversions, Retention and Profits," IBM, retrieved from the internet: ftp://ftp.software.ibm.com/software/au/lotus/pdfs/Analytics_Optimized_Routing.pdf. pp 1-2.
"IBM Real-Time Analytics Matching Platform (RAMP)," IBM, retrieved from the Internet: https://web.archive.org/web/20141016002219/http://www-935.ibm.com/services/us/en/business-services/ibm-real-time-analytics-matching-platform-ramp.html pp. 1-2.
"RAMP: Real-time Analytics Matching Platform: An Analytics Optimized Routing Approach for Inbound Calls," Assurant, Inc., retrieved from the internet: https://web.archive.org/web/*/http://www.assurantsolutions.com/ramp/pdf/RAMP%20onepager.pdf pp. 1.
Best Practices for Implementing Advanced Skills-Based Routing in the Contact Center, Genesys, Mar. 2008, Retrieved from http://www.iconvoicenetworks.com/assets/WHITEPAPER_ALU_Skills-Based_Routing.pdf pp. 1-10.
"New IBM Service Plays Real-Time Matchmaker in Call Centers," Phys.Org, Mar. 18, 2010. Retrieved from http://phys.org/news188153721.html pp. 1-2.
"Precision Routing Documentation", Cisco, Feb. 1, 2013, Retrieved from http://docwiki.cisco.com/wiki/Precision_Routing_Documentation pp. 1-10.

* cited by examiner

TEAM-BASED APPROACH TO SKILLS-BASED AGENT ASSIGNMENT

BACKGROUND

Embodiments of the present invention relate generally to methods and systems for agent task assignment in a task routing system such as a Customer Relationship Management (CRM) system, Automatic Call Distribution (ACD) system, or other similar system and more particularly to a team-based approach to skills-based agent assignment.

Customer Relationship Management (CRM) systems provide support for customers of a product or service by allowing those users to make requests for service that can include a question posed by the user related to the product or service. For example, a user may log onto or access a CRM system provided by a manufacturer of cellphones and request information related to use of that device and that may include a question such as "How do I adjust the brightness of the display?" Generally speaking, these systems receive requests for service, e.g., in the form of a phone call, web page form, instant message, email, etc., and route the requests to a human agent for addressing the request and providing an answer to the question. In ideal cases, the agent is selected based on the topic of the question or request.

However, this "best agent selection" capability in skills-based routing systems is, in practice, rarely exercised in busy contact centers because all agents are occupied most of the time and assignment decisions are made when a single agent becomes available. Since only one agent is available at any instant, the assignment algorithm does not really have an opportunity to select "the best agent". Rather, when assignment decisions are made for the single agent who is momentarily available, the assignment is most often made on a first-availability basis or, at best, the assignment algorithm is only able to optimize at a micro level and not at a macro level. Hence, there is a need in the art for improved skills-based assignment processes in CRM systems.

BRIEF SUMMARY

Embodiments described herein provide systems and methods for a team-based approach to skills-based agent assignment in task routing systems. According to one embodiment, performing skills-based task assignments in a task routing system can comprise identifying a team of agents. The team of agents can comprise a plurality of agents handling a currently assigned task but expected to become available for assignment of a new task. For example, identifying the team of agents can comprise identifying agents who have reached a wrap-up state in handling the currently assigned task. Identifying agents who have reached a wrap-up state in handling the currently assigned task can be based at least in part on a defined workflow for the currently assigned task. Each agent of the team of agents can be earmarked to one of a plurality of new tasks selected from a queue of tasks. At some point, one of the agents of the team can be detected as being available and the agent detected as being available can be assigned to one of the plurality of new tasks based at least in part on consideration of the earmarking of the agents of the team to the plurality of new tasks. In some cases, prior to detecting one of the agents of the team as being available, the earmarking of each agent of the team of agents to one of the plurality of new tasks may be refreshed, e.g., periodically, by repeating the identifying the team of agents and the earmarking each agent of the team of agents to one of the plurality of new tasks selected from the queue of tasks.

In some embodiments, earmarking each agent of the team of agents to one of the plurality of new tasks can comprise determining a number of agents in the identified team of agents, selecting a number of new tasks from the queue of tasks based on a priority of the tasks, wherein the number of new tasks corresponds to the number of agents in the identified team, calculating an assignment score for each agent in the team relative to each selected new task, and earmarking each agent in the team to one of the selected new tasks based on the calculated assignment scores. A task from the selected new tasks having a highest priority can be assigned to an agent having a highest assignment score for this task and the assigning a task from the selected new tasks having a highest priority to an agent having a highest assignment score for this task can be repeated until all of the selected new tasks have been assigned. In other cases, earmarking each agent in the team to one of the selected new tasks based on the calculated assignment scores can comprise generating all possible combinations of agents in the team and the selected new tasks, calculating an aggregate assignment score for each possible combination of agents in the team and the selected new tasks, and selecting the combination of agents in the team and the selected new tasks having a highest aggregate assignment score.

In one embodiment, assigning the agent detected as being available to one of the plurality of new tasks based at least in part on consideration of the earmarking of the agents of the team to the plurality of new tasks can comprise identifying, by a computer system, a team of agents by: accessing a memory containing a task queue and identifying a plurality of agents from the task queue, wherein each agent is handling a currently assigned task as assigned in the task queue, and for each agent of the plurality of agents identified: detecting whether the agent has reached a wrap-up state in handling the currently assigned task based on a defined workflow for the currently assigned task, determining if the agent in the wrap-up state will be available in a next X seconds based on the defined workflow for the currently assigned task being handled by the agent, and adding the agent to the team of agents if the agent has reached the wrap-up state and will be available in the next X seconds. Each agent of the team of agents may then be earmarked to a waiting task of a plurality of new tasks selected from the task queue.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for a team-based approach to skills-based agent assignment in a task routing system such as a Customer Relationship Management (CRM) system, Automatic Call Distribution (ACD) system, or other similar system. More specifically, embodiments of the present invention provide for skills-based routing in a way that creates an opportunity to perform best agent assignment even in busy contact centers by looking ahead to anticipate the set of agents who will become available in the near future, and which optimizes the assignment of those agents to the work items in queue to achieve the best team-level results. Various additional details of embodiments of the present invention will be described below with reference to the figures.

Figure 1:
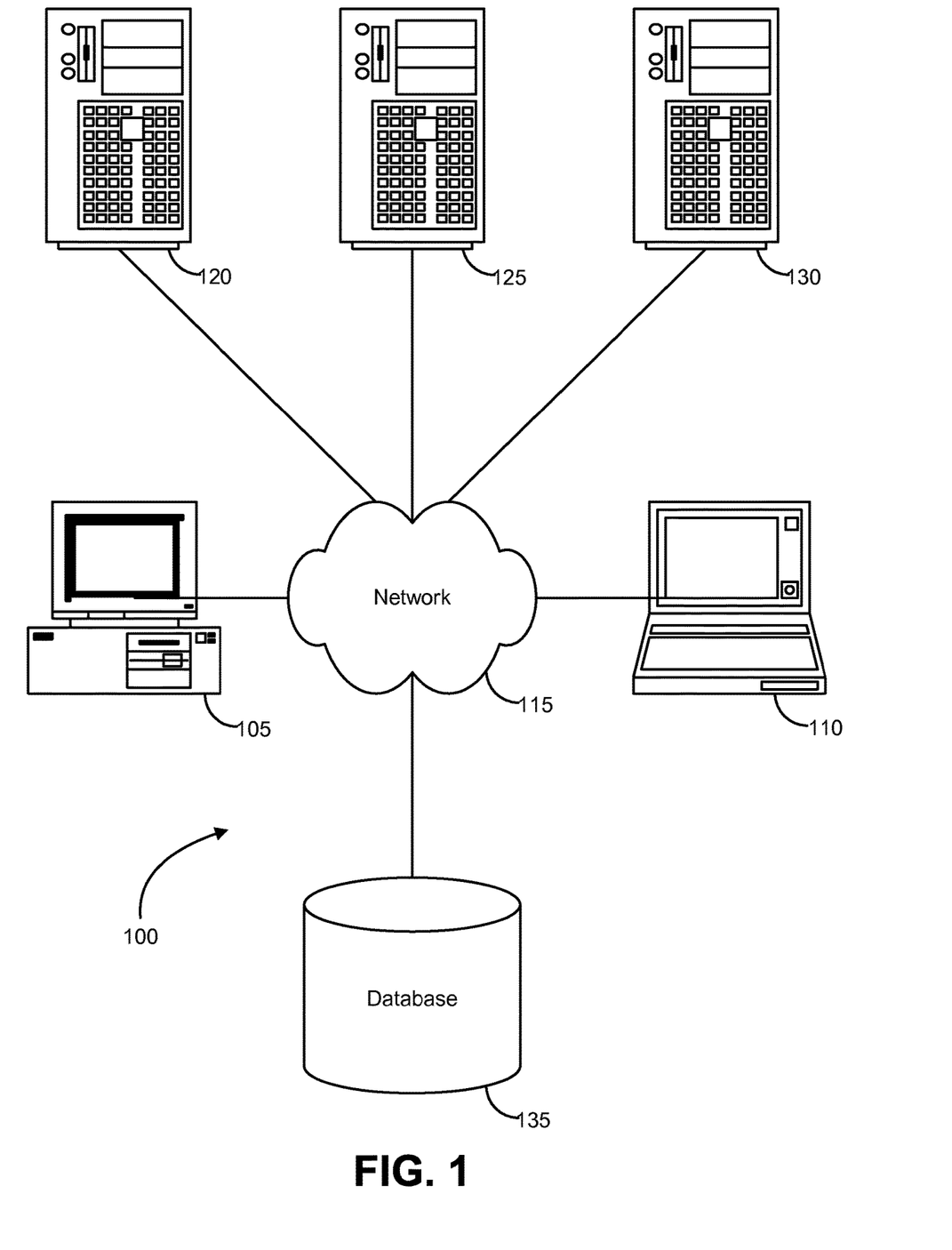
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can a network that can support data communications using any of a variety of protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN"). Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
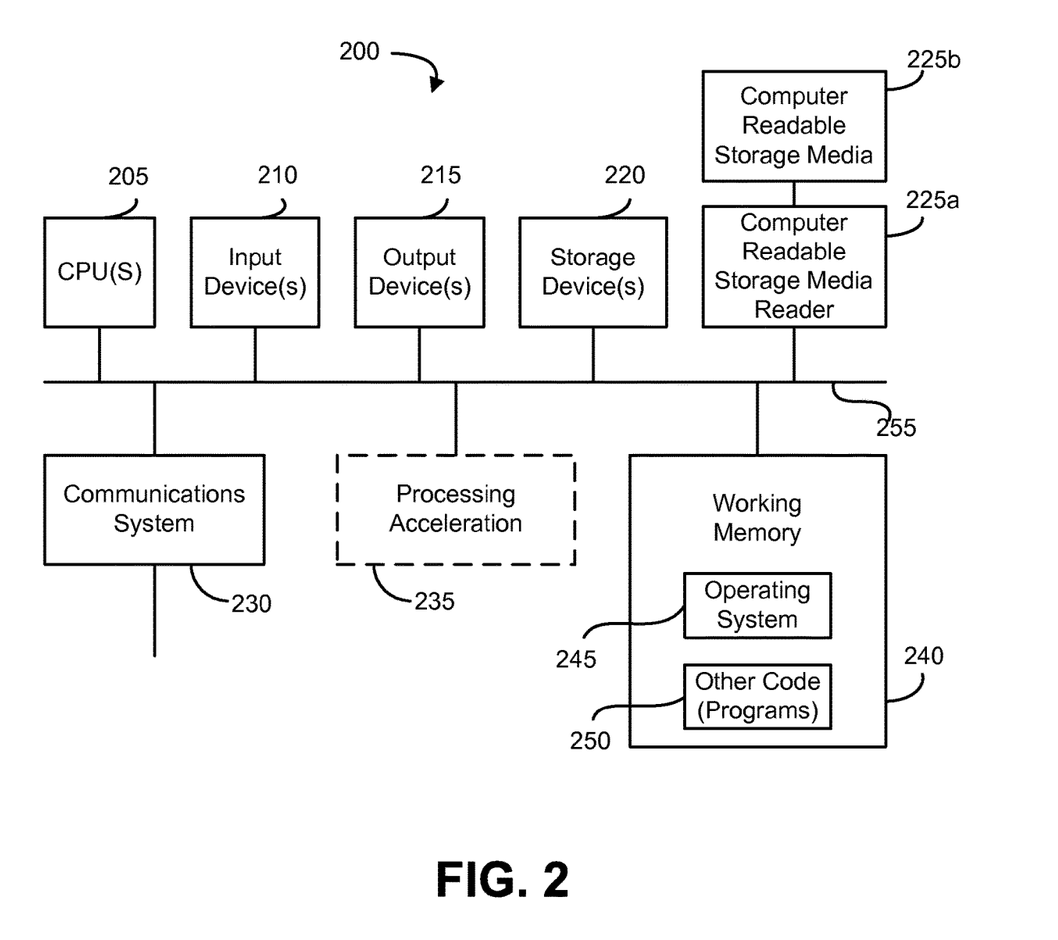
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
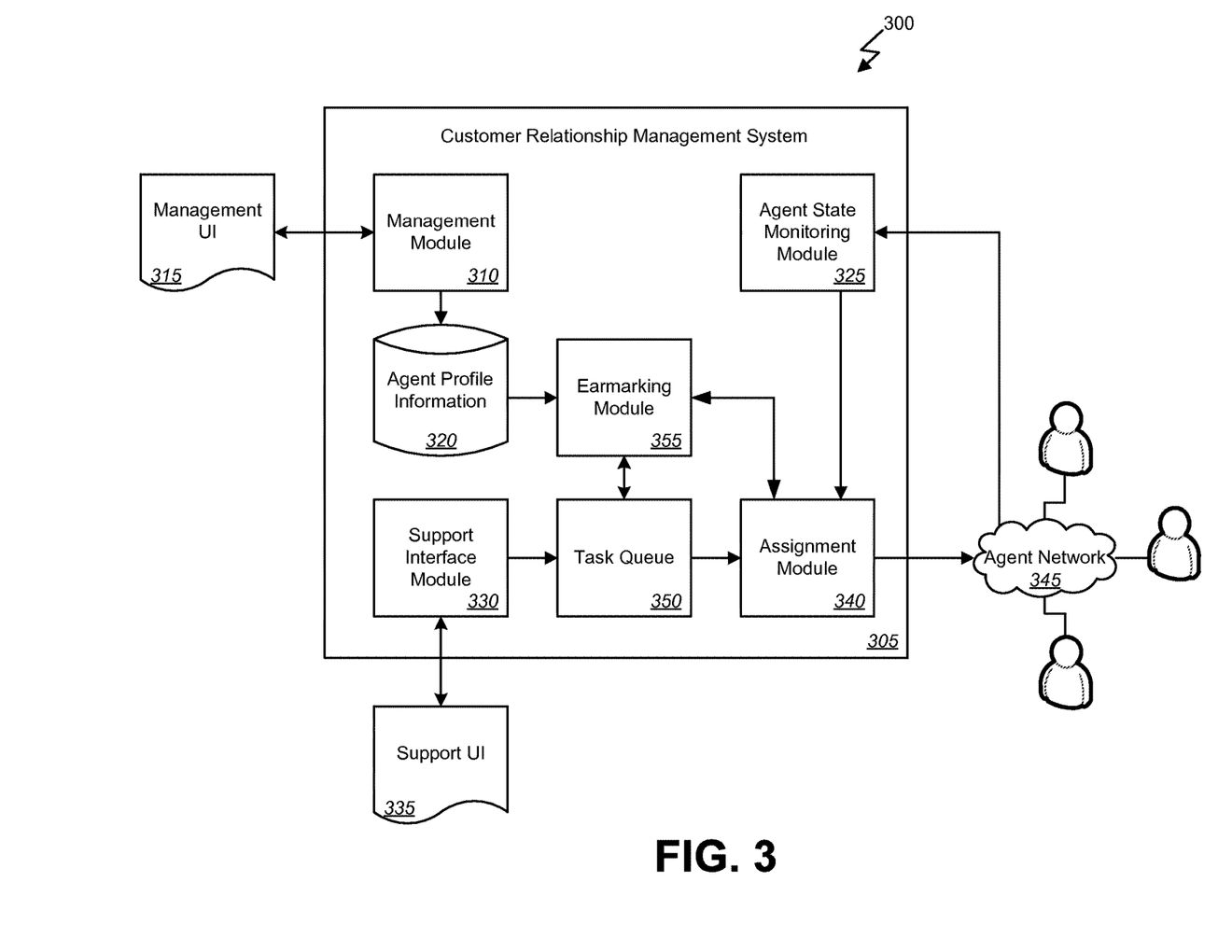
FIG. 3 is a block diagram illustrating, at a high-level, functional components of a system for performing agent assignment according to one embodiment of the present invention.

FIG. 3 is a block diagram illustrating, at a high-level, functional components of a system for performing agent assignment according to one embodiment of the present invention. Embodiments of the invention provide systems and methods for a team-based approach to skills-based agent assignment in a task routing system such as a Customer Relationship Management (CRM) system, Automatic Call Distribution (ACD) system, or other similar system. It should be noted that, while described herein with reference to a CRM, embodiments of the present invention are equally applicable to any of these other systems. In the example illustrated in FIG. 3, the system 300 includes a CRM system 305 such as may be executed on a server or another computer or computing device as described above. The CRM system 305 can include a management module 310 which provides a management user interface 315 such as a set of web pages or other interface. Through this interface 315, a supervisor, manager, administrator, etc. can interact with the management module 310 to define agent profile information 320 for each of one or more customer service agents 345. Generally speaking, the profile information 320 can include information indicating topics or areas of expertise for which a particular agent is considered qualified to answer customer questions or requests. The agent profile information 320 may be stored in one or more data records associated with each agent.

Additionally, the CRM system 305 can support a number of users, such as end users of a product or service, can receive requests for support or service from those users, and process those requests in order to connect or direct the requesting users to one or more agents 345 for answers to questions posed in the requests. For example, a support interface module 330 of the CRM system 305 can provide one or more interfaces 335 including but not limited to web pages, email addresses, phone lines, chat and/or instant messaging, and/or any of a variety of other communication channels to customer users of the system. Through these channels/interfaces 335, the customers can make requests for support that may include questions to be answered by the agents 345. Once received, these requests and/or questions can be added to a task queue 350 created in a memory and evaluated by an assignment module 340. This evaluation can include determining a content or topic of the request, determining a complexity score indicating a relative difficulty of the request or questions, etc. Based on this evaluation and the agent profile information 320, the assignment module 340 of the CRM system can then direct the request and/or question to a selected agent with matching expertise. That is, the routing module can identify an agent with a skillset that is appropriate for the nature of the request and then connect the customer with that agent through email, phone, chat and/or instant messaging, and/or any of a variety of other communication channels. For example, the agent's skill set is determined from one or more records containing the agent profile information 320. The skill set is matched/compared to properties of the request (a waiting task to be assigned to an agent) to determine if the skill set is appropriate. In one embodiment, an agent is added to the team of agents possibly assigned to a given waiting task only if the agent's skill set is appropriate for the waiting task. Once an agent is selected for assignment, the routing module re-assigns the agent (who is currently assigned to a task in the task queue) to the waiting task earmarked for the agent. In response to the re-assigning, a communication connection (via a network) is established between a first device of the agent to a second device of a user/customer associated with the waiting task earmarked for the agent.

Ideally, the agent assignments made by the assignment module 340 are made to best match the topic and/or nature of the customer's request or question to the skills of a particular agent. However, skills-based assignments in practice do not always operate as intended because the call center is always busy and there is seldom an opportunity to select from multiple available agents. In fact, the best agent selection capability in skills-based routing systems is rarely exercised in busy contact centers because all agents are occupied most of the time and assignment decisions are made when a single agent becomes available. Since only one agent is available at any instant, the assignment algorithm of the assignment module 340 does not really have an opportunity to select "the best agent" but rather is selecting the first available agent.

Therefore, embodiments of the present invention can artificially create an environment where multiple agents 345 are considered against multiple work items in the task queue 350 to achieve better matches at a team level. This can be done by an agent state monitoring module 325 "looking ahead" to anticipate which agents 345 are expected to become free in the near future, e.g., the next X seconds, and an earmarking module 355 executing an assignment algorithm to make the assignment of the agents as a set against the work items in the task queue 350 based on the skills of that team of agents as defined in the agent profile information 320. In the simplest case, the look-ahead can be achieved by the agent state monitoring module 325 of the CRM system 305 monitoring which agents 345 are currently handling tasks but have entered a "wrap-up" state. Another implementation could analyze the agent's workflow progress in more detail. Thus, in one embodiment, the system identifies the team of agents by: accessing a memory containing the task queue and identifying a plurality of agents from the task queue, wherein each agent is handling a currently assigned task as assigned in the task queue but may soon be available. For each agent of the plurality of agents identified: detecting whether the agent has reached a wrap-up state in handling the currently assigned task based on a defined workflow for the currently assigned task and determining if the agent in the wrap-up state will be available in a next X seconds based on the defined workflow for the currently assigned task being handled by the agent. The agent is added to the team of agents if the agent has reached the wrap-up state and will be available in the next X seconds.

Once the team of agents has been selected by the agent state monitoring module 325, the earmarking module 355 can apply an algorithm that optimizes the assignment of the team of agents to work items selected from the task queue 350 in the memory to achieve a higher total score. i.e. improve the outcome at a team level rather than at an individual agent level. That is, the earmarking module 355 can "earmark" or pre-assign a work item in the task queue 350 for an agent who is expected to become free, and then the assignment module 340 can execute the assignment when the agent actually becomes free. This "earmarking" approach also enables the assignments to be done rapidly in real-time when an agent becomes available.

More specifically, the earmarking module 355 can implement an assignment algorithm that is directed to making skills-based decisions across a team of multiple agents instead of making a single assignment decision based on the first agent to become available. For example, suppose there are N agents who are anticipated by the agent state monitoring module 325 to become available in the near future, .e.g., the next X seconds or other limit that defines an acceptable period. The algorithm employed by the earmarking module 355 can calculate an assignment score for each agent relative to each of the next N work items in the task queue 350, i.e. creating a N-by-N score grid. The earmarking module 355 can then execute an agent assignment algorithm that earmarks the top N work items to the next N agents to become available. For example, this algorithm may start with the highest priority work item, earmark that work item to the agent who has the highest score for this work item, and continue through the list of N work items in priority order until each of the N work items has been earmarked for an agent. It should be noted that other algorithms may be used by the earmarking module 355 and are considered to be within the scope of the present invention. For example, another assignment algorithm that might be used by the earmarking module 355 could explore all possible combinations of agents on the team selected by the agent state monitoring module 325 to a matching number of work items selected from the task queue 350 (e.g., selected based on priority) to identify the combinations of agents and tasks with the highest aggregate score. In another example, the Hungarian Algorithm may be used to this type of matching or assignment. Regardless of exactly which assignment algorithm is used, the earmarking module 355 can periodically (e.g., every 5 to 10 seconds) refresh or re-run the earmarking assignment algorithm. The calculated scores and assignments can be cached to make the re-execution of the assignment algorithm and actual assignment by the assignment module 340 when an agent does become available as efficient as possible.

The assignment module 340 can then use these calculated scores and assignments to assign a work item to an agent when the agent actually becomes available. For example, if the available agent has already been earmarked for a work item, the assignment module 340 can assign that work item to the agent. On the other hand, if the available agent has not yet been earmarked for a work item (e.g. if the agent finished a task sooner than anticipated, if there was no qualifying work item in the list selected from the task queue 350, if an earmarked work item has been abandoned by the customer, etc.), the assignment module 340 can execute a default algorithm to select a work item for this agent.

Stated another way, performing skills-based task assignments in a CRM system 305 can comprise identifying by an agent state monitoring module 325 a team of agents 345. The team of agents 345 can comprise a plurality of agents, each handling a currently assigned task but who are expected by the agent state monitoring module 325 to become available for assignment of a new task. For example, identifying the team of agents can comprise identifying agents who have reached a wrap-up state in handling the currently assigned task. Identifying agents who have reached a wrap-up state in handling the currently assigned task can be based, for example, on a defined workflow for the currently assigned task.

Once identified the agent state monitoring module 325, each agent of the team of agents can be earmarked to one of a plurality of new tasks selected from a queue of tasks 350 by an earmarking module 355. That is, each agent can be pre-assigned by the earmarking module 355 to a waiting task from the task queue 350. Once one of the agents of the team, or even another agent within the CRM system 305 but not in the identified team, is detected as being available, the agent detected as being available can be assigned to one of the plurality of new tasks by an assignment module 340. Assignment of the available agent by the assignment module 340 can be based at least in part on consideration of the earmarking of the agents of the team to the plurality of new tasks.

In some cases, prior to detecting one of the agents as being available, the earmarking of each agent of the team of agents to one of the plurality of new tasks can be refreshed by the earmarking module 355. For example, the earmarking may be refreshed by the agent state monitoring module 325 repeating the identifying of the team of agents and the earmarking module 355 repeating the earmarking of each agent of the team of agents to one of the plurality of new tasks selected from the queue of tasks 350. Refreshing the earmarking of each agent of the team of agents to one of the plurality of new tasks can be repeated periodically, upon request, upon the occurrence of some event, such as an assignment of one of the agent, removal of one of the tasks from the queue, etc.

Earmarking each agent of the team of agents to one of the plurality of new tasks can comprise the earmarking module 355 determining a number of agents in the identified team of agents and selecting a number of new tasks from the queue of tasks 350 based on a priority of the tasks. The number of new tasks selected by the earmarking module 355 can correspond to the number of agents in the identified team. An assignment score can be calculated by the earmarking module 355 for each agent in the team relative to each selected new task and each agent in the team can be earmarked to one of the selected new tasks based on the calculated assignment scores.

For example, earmarking each agent in the team to one of the selected new tasks based on the calculated assignment scores can comprise the earmarking module 355 assigning a task from the selected new tasks having a highest priority to an agent having a highest assignment score for this task and repeating the assigning a task from the selected new tasks having a highest priority to an agent having a highest assignment score for this task until all of the selected new tasks have been assigned. In another example, earmarking each agent in the team to one of the selected new tasks based on the calculated assignment scores can comprise the earmarking module 355 generating all possible combinations of agents in the team and the selected new tasks, calculating an aggregate assignment score for each possible combination of agents in the team and the selected new tasks, and selecting the combination of agents in the team and the selected new tasks having a highest aggregate assignment score. Other possible algorithms used by the earmarking module 355 for earmarking or pre-assigning agents to tasks are contemplated and considered to be within the scope of the present invention.

Assigning the agent detected as being available to one of the plurality of new tasks based at least in part on consideration of the earmarking of the agents of the team to the plurality of new tasks by the assignment module 340 can comprise identifying the agent detected as being available. A determination can then be made by the assignment module 340 as to whether the identified agent is earmarked to one of the plurality of new tasks selected from a queue of tasks. In response to determining the identified agent is earmarked to one of the plurality of new tasks selected from a queue of tasks, that task to which the agent is earmarked can be assigned by the assignment module 340 to the identified agent. In response to determining the identified agent is not earmarked to one of the plurality of new tasks selected from a queue of tasks, a task can be assigned to the identified agent by the assignment module 340 using a skills-based or other default assignment algorithm.

Figure 4:
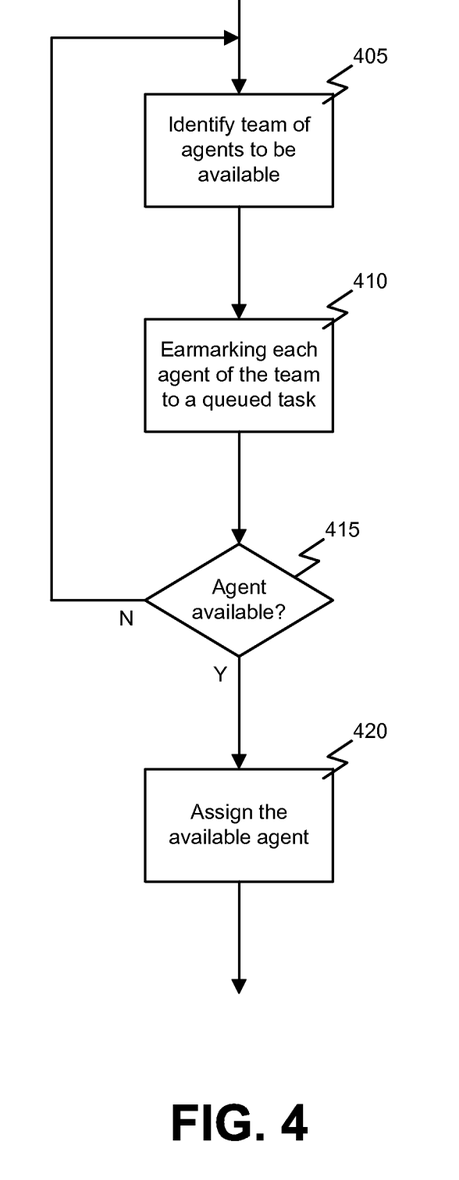
FIG. 4 is a flowchart illustrating a process for performing agent assignment according to one embodiment of the present invention.

FIG. 4 is a flowchart illustrating a process for performing agent assignment according to one embodiment of the present invention. As illustrated in this example, performing skills-based task assignments in a CRM system can comprise identifying 405 a team of agents. The team of agents can comprise a plurality of agents, each handling a currently assigned task but who are expected to become available for assignment of a new task. For example, identifying 405 the team of agents can comprise identifying agents who have reached a wrap-up state in handling the currently assigned task. Identifying agents who have reached a wrap-up state in handling the currently assigned task can be based, for example, on a defined workflow for the currently assigned task.

Once identified 405, each agent of the team of agents can be earmarked 410 to one of a plurality of new tasks selected from a queue of tasks. That is, each agent can be pre-assigned to a waiting task. An example of an exemplary process for earmarking agents to tasks will be described in greater detail below with reference to FIG. 5. Once one of the agents of the team, or even another agent within the CRM system but not in the identified team, is detected 415 as being available, the agent detected 415 as being available can be assigned 420 to one of the plurality of new tasks. Assignment of the available agent can be based at least in part on consideration of the earmarking of the agents of the team to the plurality of new tasks. Additional details of an exemplary process for assigning the available agent will be described in greater detail below with reference to FIG. 6.

In some cases, prior to detecting 415 one of the agents as being available, the earmarking of each agent of the team of agents to one of the plurality of new tasks can be refreshed. For example, the earmarking may be refreshed by repeating the identifying 405 of the team of agents and the earmarking 410 of each agent of the team of agents to one of the plurality of new tasks selected from the queue of tasks. Refreshing the earmarking of each agent of the team of agents to one of the plurality of new tasks can be repeated periodically, upon request, upon the occurrence of some event, such as an assignment of one of the agent, removal of one of the tasks from the queue, etc.

Figure 5:
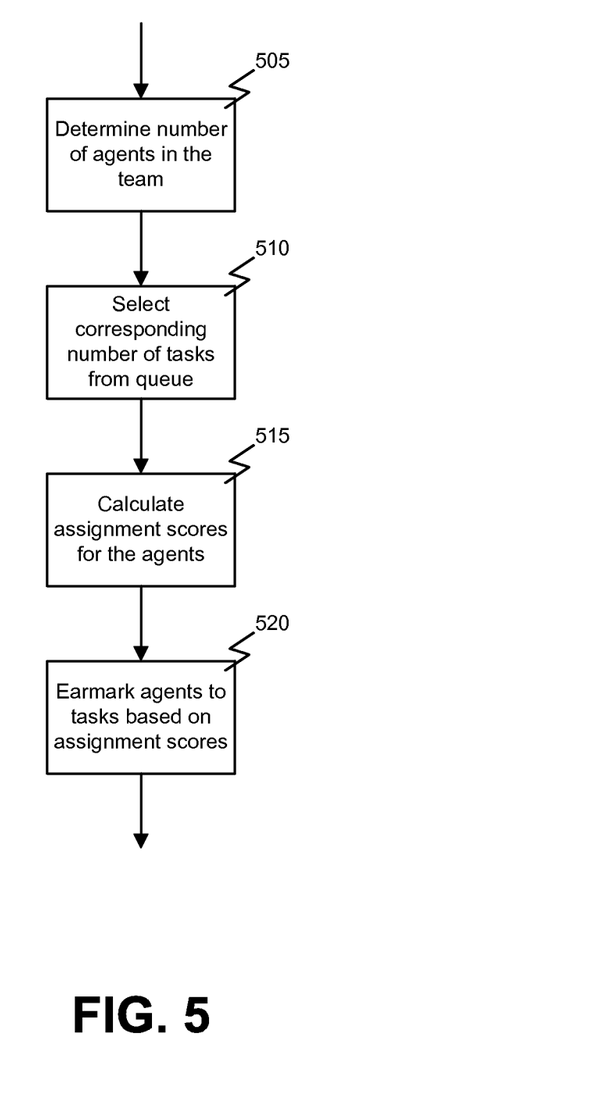
FIG. 5 is a flowchart illustrating additional details of a process for performing assignment of a team of agents according to one embodiment of the present invention.

FIG. 5 is a flowchart illustrating additional details of a process for performing assignment of a team of agents according to one embodiment of the present invention. As illustrated in this example, earmarking each agent of the team of agents to one of the plurality of new tasks can comprise determining 505 a number of agents in the identified team of agents and selecting 510 a number of new tasks from the queue of tasks based on a priority of the tasks. The number of new tasks selected can correspond to the number of agents in the identified team. An assignment score can be calculated 515 for each agent in the team relative to each selected new task and each agent in the team can be earmarked 520 to one of the selected new tasks based on the calculated assignment scores.

For example, earmarking 520 each agent in the team to one of the selected new tasks based on the calculated assignment scores can comprise assign a task from the selected new tasks having a highest priority to an agent having a highest assignment score for this task and repeating the assigning a task from the selected new tasks having a highest priority to an agent having a highest assignment score for this task until all of the selected new tasks have been assigned. In another example, earmarking 520 each agent in the team to one of the selected new tasks based on the calculated assignment scores can comprise generating all possible combinations of agents in the team and the selected new tasks, calculating an aggregate assignment score for each possible combination of agents in the team and the selected new tasks, and selecting the combination of agents in the team and the selected new tasks having a highest aggregate assignment score. Other possible algorithms for earmarking or pre-assigning agents to tasks are contemplated and considered to be within the scope of the present invention.

Figure 6:
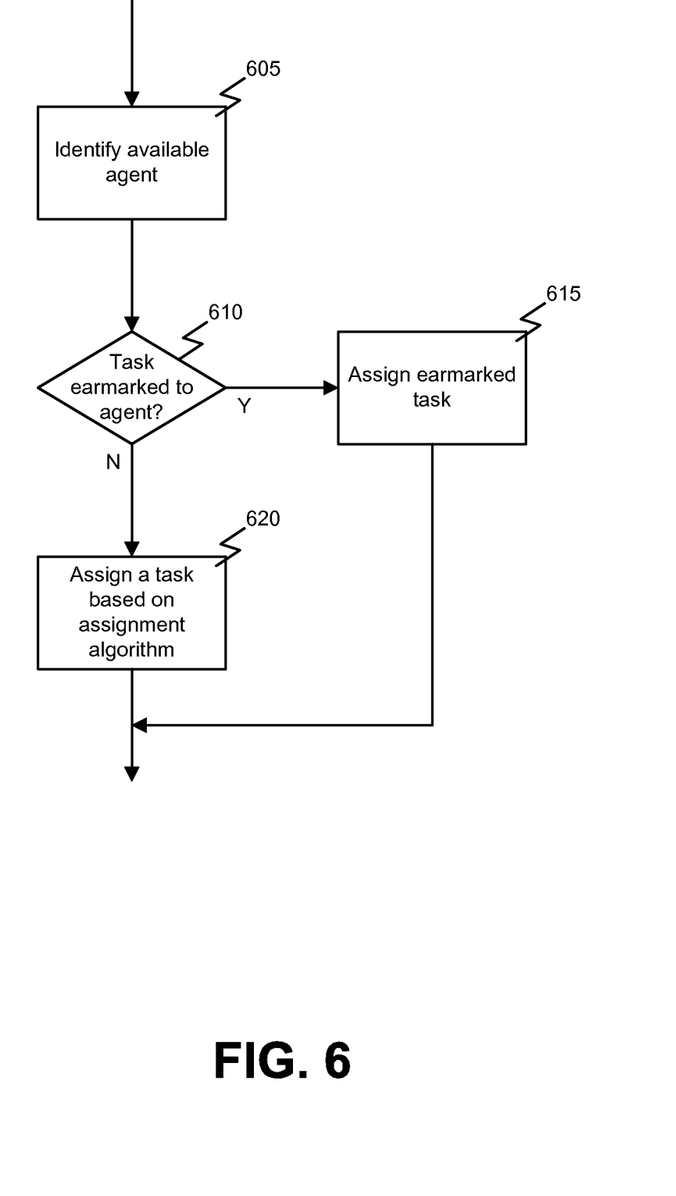
FIG. 6 is a flowchart illustrating additional details of a process for performing assignment of an individual agent according to one embodiment of the present invention.

FIG. 6 is a flowchart illustrating additional details of a process for performing assignment of an individual agent according to one embodiment of the present invention. As illustrated in this example, assigning the agent detected as being available to one of the plurality of new tasks based at least in part on consideration of the earmarking of the agents of the team to the plurality of new tasks can comprise identifying 605 the agent detected as being available. A determination 610 can then be made as to whether the identified agent is earmarked to one of the plurality of new tasks selected from a queue of tasks. In response to determining 610 the identified agent is earmarked to one of the plurality of new tasks selected from a queue of tasks, that task to which the agent is earmarked can be assigned 615 to the identified agent. In response to determining 610 the identified agent is not earmarked to one of the plurality of new tasks selected from a queue of tasks, a task can be assigned 620 to the identified agent using a skills-based or other default assignment algorithm.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for performing task assignments in a task routing system, the method comprising:
   identifying, by a computer system, a team of agents by:
      accessing a memory containing a task queue and identifying a plurality of assigned agents from the task queue, wherein each assigned agent is handling a currently assigned task as assigned in the task queue, and
      for each assigned agent of the plurality of agents identified:
         detecting whether the assigned agent has reached a wrap-up state in handling the currently assigned task based on a defined workflow for the currently assigned task,
         determining if the assigned agent in the wrap-up state will be available in a next X seconds based on the defined workflow for the currently assigned task being handled by the assigned agent, and
         adding the assigned agent back into the team of agents if the assigned agent has reached the wrap-up state and will be available in the next X seconds;
   earmarking, in the memory, each agent of the team of agents to a waiting task of a plurality of new tasks selected from the task queue;
   wherein the earmarking includes:
      determining a number N of agents in the identified team of agents;
      selecting a number of new tasks from the task queue based on a priority of the tasks, wherein the number of new tasks corresponds to the number N of agents;
      calculating an assignment score for each agent in the team of agents relative to each selected new task based on skills defined in a profile of the agent as compared to properties of each selected new task; and
      creating an N-by-N score grid comprising the number of new tasks where each task is assigned to one agent of the number N of agents based on the calculated assignment scores;
   prior to detecting one of the agents of the team as being available, refreshing the earmarking of each agent of the team of agents to one of the plurality of new tasks by repeating the identifying of the team of agents, recalculating the assignment score for each agent in the N-by-N score grid relative to each new task based on skills defined in the profile of the agent, and earmarking of each agent of the team of agents to one of the plurality of new tasks based on the N-by-N score grid;
   in response to detecting one of the agents of the team of agents as being available based on completing the wrap-up state of the agent:

accessing the memory and identifying the agent in the task queue;

re-assigning the agent from the currently assigned task in the task queue to the waiting task earmarked for the agent; and in response to the re-assigning, establishing a communication connection, by the computer system, between a first device of the agent to a second device of a user associated with the waiting task earmarked for the agent.

2. The method of claim 1, wherein the communication connection is established, by the computer system, through a communication channel over a network.

3. The method of claim 1, further retrieving agent profile information from the plurality of agents and determining a skillset for each of the agents prior to adding the agent to the team of agents; and identifying an agent from the plurality of agents that has the skillset that is appropriate for the waiting task and adding the agent to the team of agents only if the skillset is appropriate for the waiting task.

4. The method of claim 1, wherein detecting whether the agent has reached a wrap-up state further comprises detecting whether the agent is within a threshold period of time of completing the currently assigned task.

5. The method of claim 1, wherein earmarking each agent in the team to one of the selected new tasks based on the calculated assignment scores comprises: repeating an assignment of a task from the selected new tasks having a highest priority to an agent having a highest assignment score for this task until all of the selected new tasks have been assigned.

6. The method of claim 1, wherein earmarking each agent in the team to one of the selected new tasks based on the calculated assignment scores comprises: generating all possible combinations of agents in the team and the selected new tasks; calculating an aggregate assignment score for each possible combination of agents in the team and the selected new tasks; and selecting the combination of agents in the team and the selected new tasks having a highest aggregate assignment score.

7. A computer system comprising:

a processor; and a memory coupled with and readable by the processor and storing therein a set of instructions which, when executed by the processor, causes the processor to perform skills-based task assignments by:

(i) identifying, by at least the processor, a team of agents by:

accessing the memory containing a task queue and identifying a plurality of agents from the task queue, wherein each agent is handling a currently assigned task as assigned in the task queue, and for each agent of the plurality of agents identified:

detecting whether the agent has reached a wrap-up state in handling the currently assigned task based on a defined workflow for the currently assigned task, determining if the agent in the wrap-up state will be available in a next X seconds based on the defined workflow for the currently assigned task being handled by the agent, and adding the agent to the team of agents if the agent has reached the wrap-up state and will be available in the next X seconds;

(ii) earmarking, in the memory, each agent of the team of agents to a waiting task of a plurality of new tasks selected from the task queue;

wherein the earmarking includes:

determining a number N of agents in the identified team of agents;

selecting a number of new tasks from the task queue based on a priority of the tasks, wherein the number of new tasks corresponds to the number N of agents;

calculating an assignment score for each agent in the team of agents relative to each selected new task based on skills defined in a profile of the agent as compared to properties of each selected new task; and creating an N-by-N score grid comprising the number of new tasks where each task is assigned to one agent of the number N of agents based on the calculated assignment scores;

(iii) prior to detecting one of the agents of the team as being available, refreshing the earmarking of each agent of the team of agents to one of the plurality of new tasks by repeating the identifying of the team of agents, recalculating the assignment score for each agent in the N-by-N score grid relative to each new task based on skills defined in the profile of the agent, and earmarking of each agent of the team of agents to one of the plurality of new tasks based on the N-by-N score grid; and (iv) in response to detecting one of the agents of the team of agents as being available based on completing the wrap-up state of the agent:

accessing the memory and identifying the agent in the task queue;

re-assigning the agent from the currently assigned task in the task queue to the waiting task earmarked for the agent; and in response to the re-assigning, establishing a communication connection by the computer system between a first device of the agent to a second device of a user associated with the waiting task earmarked for the agent.

8. The computer system of claim 7, wherein the communication connection is established by the computer system through a communication channel over a network.

9. The computer system of claim 7, wherein the set of instructions further include instructions for causing the processor to:

retrieve agent profile information assigned to the plurality of agents and determining a skillset for each of the agents prior to adding the agent to the team of agents; and identify an agent from the plurality of agents that has the skillset that is appropriate for the waiting task and adding the agent to the team of agents only if the skillset is appropriate for the waiting task.

10. The computer system of claim 7, wherein detecting whether the agent has reached a wrap-up state further comprises instructions to cause the processor to detect whether the agent is within a threshold period of time of completing the currently assigned task.

11. A non-transitory computer-readable medium comprising a set of instructions stored therein which, when executed by a processor via a memory, causes the processor to:

(i) identify, by at least the processor, a team of agents by:

accessing the memory containing a task queue and identifying a plurality of agents from the task queue, wherein each agent is handling a currently assigned task as assigned in the task queue, and for each agent of the plurality of agents identified:

detecting whether the agent has reached a wrap-up state in handling the currently assigned task based on a defined workflow for the currently assigned task, determining if the agent in the wrap-up state will be available in a next X seconds based on the defined workflow for the currently assigned task being handled by the agent, and adding the agent to the team of agents if the agent has reached the wrap-up state and will be available in the next X seconds;

(ii) earmark each agent of the team of agents to a waiting task of a plurality of new tasks selected from the task queue;

wherein the earmarking includes:

determining a number N of agents in the identified team of agents;

selecting a number of new tasks from the task queue based on a priority of the tasks, wherein the number of new tasks corresponds to the number N of agents;

calculating an assignment score for each agent in the team of agents relative to each selected new task based on skills defined in a profile of the agent as compared to properties of each selected new task; and creating an N-by-N score grid comprising the number of new tasks where each task is assigned to one agent of the number N of agents based on the calculated assignment scores;

(iii) prior to detecting one of the agents of the team as being available, the processor is caused to refresh the earmarking of each agent of the team of agents to one of the plurality of new tasks by repeating the identifying of the team of agents, recalculating the assignment score for each agent in the N-by-N score grid relative to each new task based on skills defined in the profile of the agent, and earmarking of each agent of the team of agents to one of the plurality of new tasks based on the N-by-N score grid; and (iv) in response to detecting one of the agents of the team of agents as being available based on completing the wrap-up state of the agent:

access the memory and identify the agent in the task queue;

re-assign the agent from the currently assigned task in the task queue to the waiting task earmarked for the agent; and in response to the re-assigning, establish a communication connection by the computer system between a first device of the agent to a second device of a user associated with the waiting task earmarked for the agent.

12. The non-transitory computer-readable medium of claim 11, wherein instructions are configured to cause the processor to establish the communication connection by the computer system through a communication channel over a network.

13. The non-transitory computer-readable medium of claim 11, wherein the set of instructions further include instructions for causing the processor to:

retrieve agent profile information assigned to the plurality of agents and determining a skillset for each of the agents prior to adding the agent to the team of agents; and identify an agent from the plurality of agents that has the skillset that is appropriate for the waiting task and adding the agent to the team of agents only if the skillset is appropriate for the waiting task.

14. The non-transitory computer-readable medium of claim 11, wherein detecting whether the agent has reached a wrap-up state further comprises instructions to cause the processor to detect whether the agent is within a threshold period of time of completing the currently assigned task.

15. The non-transitory computer-readable medium of claim 11, wherein the instructions for earmarking each agent of the team of agents to one of the plurality of new tasks further causes the processor to:

in response to calculating the assignment score for each agent in the team of agents, calculate and store an indication of an association of each new task of the plurality of new tasks to one agent of the team of agents based at least in part on the plurality of assignment scores, wherein each task is associated with a different agent from the team of agents that will be available in the next X seconds to in the N-by-N score grid.

* * * * *